(12) United States Patent
Plattner (10) Patent No.: US 7,806,443 B1
(45) Date of Patent: Oct. 5, 2010

(54) METHOD AND APPARATUS FOR CONNECTING AIR CONDITIONING COOLANT LINES

(76) Inventor: Wesley M. Plattner, 1146 Breyman Hwy., Tipton, MI (US) 48287

( * ) Notice: Subject to any disclaimer, the term of this patent is extended or adjusted under 35 U.S.C. 154(b) by 444 days.

(21) Appl. No.: 11/894,382

(22) Filed: Aug. 21, 2007

Related U.S. Application Data (63) Continuation-in-part of application No. 11/725,012, filed on Mar. 16, 2007.

(51) Int. Cl.
*F16L 33/00* (2006.01)
(52) U.S. Cl. .............. 285/249; 285/342; 285/332.1; 29/890.14
(58) Field of Classification Search ........... 285/249, 285/256, 342, 343, 332, 332.2, 332.1, 348; 29/508, 890.144, 890.14
See application file for complete search history.

(56) References Cited

U.S. PATENT DOCUMENTS

| | | | |
|---|---|---|---|
| 546,906 A | | 9/1895 | Sexton |
| 2,321,260 A | * | 6/1943 | Stecher ................... 285/249 |
| 2,394,351 A | * | 2/1946 | Wurzburger .............. 285/341 |
| 2,452,276 A | * | 10/1948 | Woodling ................. 277/622 |
| 2,452,277 A | | 10/1948 | Woodling |
| 2,463,707 A | * | 3/1949 | Matousek ................. 285/341 |
| 2,466,526 A | | 4/1949 | Wolfram |
| 2,749,152 A | * | 6/1956 | Courtot ................... 285/342 |
| 2,757,943 A | * | 8/1956 | Henderson ................ 285/52 |
| 2,862,732 A | * | 12/1958 | Guillou ................... 285/342 |
| 3,232,648 A | * | 2/1966 | Franck ................... 285/322 |
| 3,265,412 A | | 8/1966 | Reid et al. |
| 3,434,744 A | * | 3/1969 | Paterson et al. ............ 285/52 |
| 3,708,186 A | | 1/1973 | Takagi et al. |
| 3,865,410 A | * | 2/1975 | Chen ...................... 285/31 |
| 3,889,989 A | * | 6/1975 | Legris .................... 285/341 |
| 3,986,736 A | | 10/1976 | Takagi et al. |
| 4,138,145 A | | 2/1979 | Lawrence |
| 4,431,216 A | * | 2/1984 | Legris .................... 285/104 |
| 4,822,082 A | * | 4/1989 | Phillipps ................. 285/334.1 |

(Continued)

*Primary Examiner*—David E Bochna
(74) *Attorney, Agent, or Firm*—Young Basile Hanlon & MacFarlane, P.C.

(57) ABSTRACT

A method and apparatus for connecting air conditioning coolant lines. The apparatus comprises a coupler body, a coolant line, a flexible annular seal, a nut, and a deformable annular retainer. The coupler body has a passageway extending therethrough and a coolant line has an end portion disposed at least partially within the passageway. A flexible annular seal is disposed within the passageway in the coupler body for sealingly engaging the deformable annular retainer. The nut receives the coolant line therein and threadedly engages the coupler body. The deformable annular retainer engages with the nut and the coupler body, and the end portion of the coolant line is disposed within the deformable annular retainer, wherein the threaded engagement of the nut with the coupler body urges the deformable annular retainer into a sealing engagement with the coupler body and the coolant line. The method includes swaging a deformable annular retainer to a coolant line, wherein the deformable annular retainer completely covers the end portion of the air conditioning coolant line; providing a nut on the coolant line; providing a coupler body having a passageway and a flexible annular seal disposed within the passageway; engaging the deformable annular retainer with the flexible annular seal to create a first seal; engaging the coupler body with the deformable annular retainer to create a second seal; and tightening a threaded engagement of the nut and the coupler body.

15 Claims, 5 Drawing Sheets

U.S. PATENT DOCUMENTS

| | | |
|---|---|---|
| 4,832,379 A | 5/1989 | Smith et al. |
| 4,844,517 A * | 7/1989 | Beiley et al. ............. 285/382.4 |
| 4,964,657 A * | 10/1990 | Gonzales ....................... 285/8 |
| 5,192,095 A * | 3/1993 | Behrens .................. 285/332.1 |
| 5,217,261 A * | 6/1993 | DeWitt et al. ............ 285/332.2 |
| 5,308,122 A * | 5/1994 | Crawford et al. .............. 285/52 |
| 5,351,998 A | 10/1994 | Behrens et al. |
| 5,560,661 A | 10/1996 | Babel et al. |
| 6,450,544 B2 * | 9/2002 | Becker et al. .............. 285/21.2 |
| 6,450,553 B1 | 9/2002 | Suresh |
| 6,488,318 B1 | 12/2002 | Shim |
| 6,505,860 B2 | 1/2003 | Trichard |
| 6,626,469 B2 * | 9/2003 | Favre et al. ................. 285/249 |
| 6,702,336 B1 | 3/2004 | Chelchowski et al. |
| 6,834,524 B2 | 12/2004 | Johnston |
| 6,988,746 B2 | 1/2006 | Olson |
| 7,090,256 B2 | 8/2006 | Inoue |
| 7,469,936 B2 * | 12/2008 | Norman ...................... 285/249 |
| 2006/0138772 A1 * | 6/2006 | Galante et al. ............. 285/249 |

* cited by examiner

METHOD AND APPARATUS FOR CONNECTING AIR CONDITIONING COOLANT LINES

CROSS-REFERENCES TO RELATED APPLICATIONS

This application is a continuation-in-part of prior U.S. patent application Ser. No. 11/725,012, filed Mar. 16, 2007.

FIELD OF THE INVENTION

The present invention relates to the field of connecting air conditioning coolant lines, and more particularly, the present invention relates to a method and apparatus for connecting air conditioning coolant lines on aircraft.

BACKGROUND OF THE INVENTION

Connecting air conditioning coolant lines on aircraft poses significant difficulty. In non-aircraft applications, air conditioning coolant lines are typically fabricated from copper and aluminum, and thus, such aircraft coolant lines are commonly welded together. However, air conditioning coolant lines on aircraft cannot be welded on an aircraft due to the risk of fire or explosion. Furthermore, installation and connection of air conditioning coolant lines is difficult due to the tight spaces that are provided to such coolant lines on aircraft.

Typically, air-conditioning coolant lines require sealed couplings and fittings which require tightening with various tools. However, the tight spaces provided on aircraft make it difficult for the installers to tighten such couplings and fittings with their tools. Although flares or fittings are useful for similar applications, they have proven ineffective for aircraft cooling systems due to the leaking of such flares and fittings caused by small molecules provided in the coolant.

It would be desirable to provide an apparatus for connecting air conditioning coolant lines on an aircraft that does not require tightening through the use of tools. It would also be desirable to provide an apparatus for connecting air conditioning coolant lines on an aircraft that was not susceptible to leaking.

BRIEF SUMMARY OF THE INVENTION

The present invention provides a method and apparatus for connecting air conditioning coolant lines on an aircraft. The apparatus for connecting air conditioning coolant lines of the present invention provides a coupler body, a coolant line, a flexible annular seal, a nut, and a deformable annular retainer.

The coupler body has a passageway extending therethrough. A chamfered engagement surface is formed in the coupler body adjacent to the passageway for complementarily engaging the deformable annular retainer. An annular groove is formed in the coupler body adjacent to the passageway and axially inward of the chamfered engagement surface. An end portion of the coolant line is disposed within the passageway in the coupler body, and the flexible annular seal is disposed within the annular groove in the coupler body for sealing engagement with the deformable annular retainer.

The nut has a first inner periphery portion and a second inner periphery portion, as well as a radially extending shoulder. The first inner periphery portion slidably engages the coolant line. The second inner periphery portion is radially spaced from the coolant line to define an annular recess. Additionally, the second inner periphery portion of the nut threadably engages the outer periphery of the coupler body.

The deformable annular retainer is disposed within the annular recess for engagement with the nut, the coolant line, and the coupler body. The deformable annular retainer has a tubular portion, and the end portion of the coolant line is disposed within the tubular portion of the deformable annular retainer. The deformable annular retainer has at least a first engagement surface that complementarily engages the chamfered engagement surface of the coupler body and at least a second engagement surface that complementarily engages the radially extending shoulder of the nut. Engagement of the nut with the coupler body urges the deformable annular retainer into sealing engagement with the coupler body and the coolant line. The deformable annular retainer may have a ferrule tube and a back ferrule, wherein the tubular portion and the first engagement surface are disposed on the ferrule tube, the second engagement surface is disposed on the back ferrule, and the ferrule tube and the back ferrule engage one another. An adhesive sealant material may be disposed between the deformable annular retainer and the coolant line.

The method for connecting air conditioning coolant lines of the present invention includes swaging a deformable annular retainer to the outer periphery of an air conditioning coolant line, wherein the deformable annular retainer completely covers the end portion of the air conditioning coolant line, providing a nut on the air conditioning coolant line, and providing a coupler body having a passageway extending therethrough and a flexible annular seal disposed within the passageway. The method further includes engaging the deformable annular retainer with the flexible annular seal to create a first seal between the coupler body and the deformable annular retainer, engaging the coupler body with the deformable annular retainer to create a second seal between the coupler body and the coolant line, and tightening a threaded engagement of the nut and the coupler body to maintain engagement of the coupler body and the deformable annular retainer.

BRIEF DESCRIPTION OF THE DRAWINGS

The description herein makes reference to the accompanying drawings wherein like referenced numerals refer to like parts throughout several views and wherein.

DETAILED DESCRIPTION OF THE INVENTION

Referring to the drawings, the present invention will now be described in detail with reference to the preferred embodiment.

Figure 1:
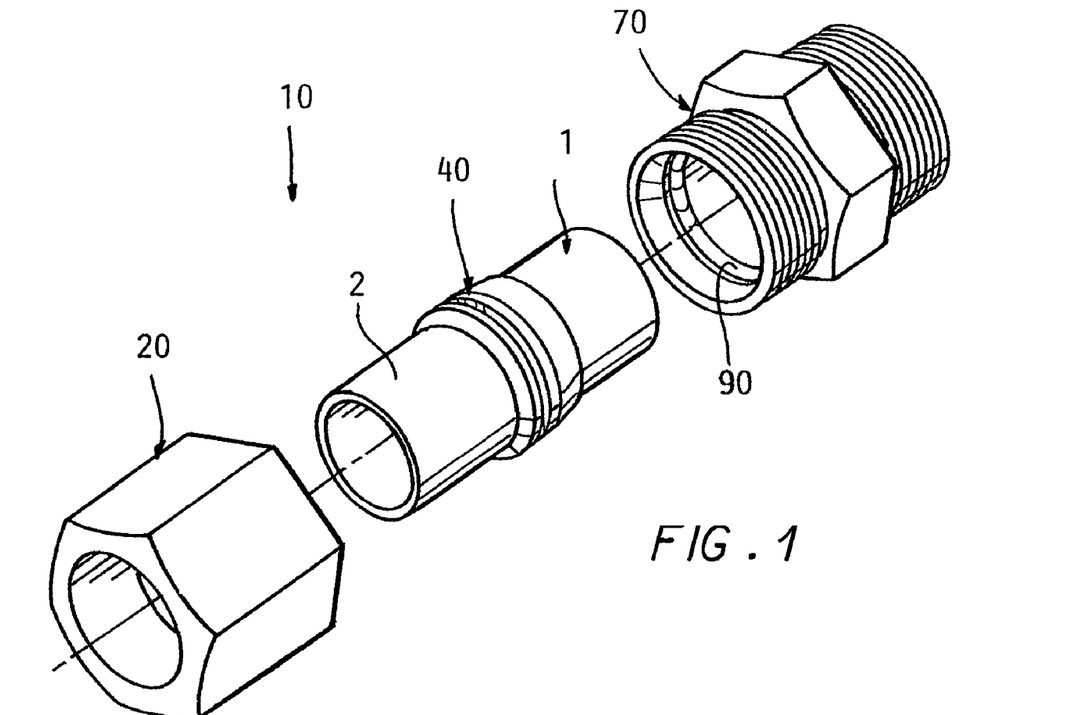
FIG. 1 is a perspective view of the apparatus for connecting air conditioning coolant lines according to a first embodiment of the present invention.

FIG. 1 shows a coupling apparatus or coupler 10 for connecting air conditioning coolant lines according to a first embodiment of the present invention. Although the present invention allows for the non-welded connection of air conditioning coolant lines in restricted spaces and is thus ideally suited for use in aircraft, the present invention is not limited to aircraft coolant lines, but rather, the present invention may be utilized in any application where air conditioning coolant lines are being connected, space is restricted, and welding is prohibited. The coupler 10 includes a coupler body 70 having a flexible annular seal or o-ring 90 mounted therein for creating a first seal between the coupler body 70 and an aircraft coolant line 1. The present invention also provides a deformable annular retainer 40 and a nut 20 that cooperate to both secure the coupler body 70 with respect to the aircraft coolant line 1 and create a second seal between the coupler body 70 and the aircraft coolant line 1. In this manner, the o-ring 90 and the deformable annular retainer 40 provide supplementary seals in case one of them is damaged. The coupler 10 of the present invention has a disengaged position, wherein the coupler body 70 is not sealed with respect to the aircraft coolant line 1, and an engaged position, wherein the coupler body 70 is sealed with respect to the aircraft coolant line 1 so that fluid, such as air conditioning coolant, may flow between the aircraft coolant line 1 and the coupler body 70 without leaking through the coupler 10.

To carry coolant through an aircraft air conditioning system, the aircraft coolant line 1 provides a thin-walled substantially tubular member that extends along a longitudinal axis 1a and has a substantially smooth, round outer periphery 2. The aircraft coolant line 1 is of a conventional design and may be fabricated from any suitable material, such as copper or aluminum.

Figure 2:
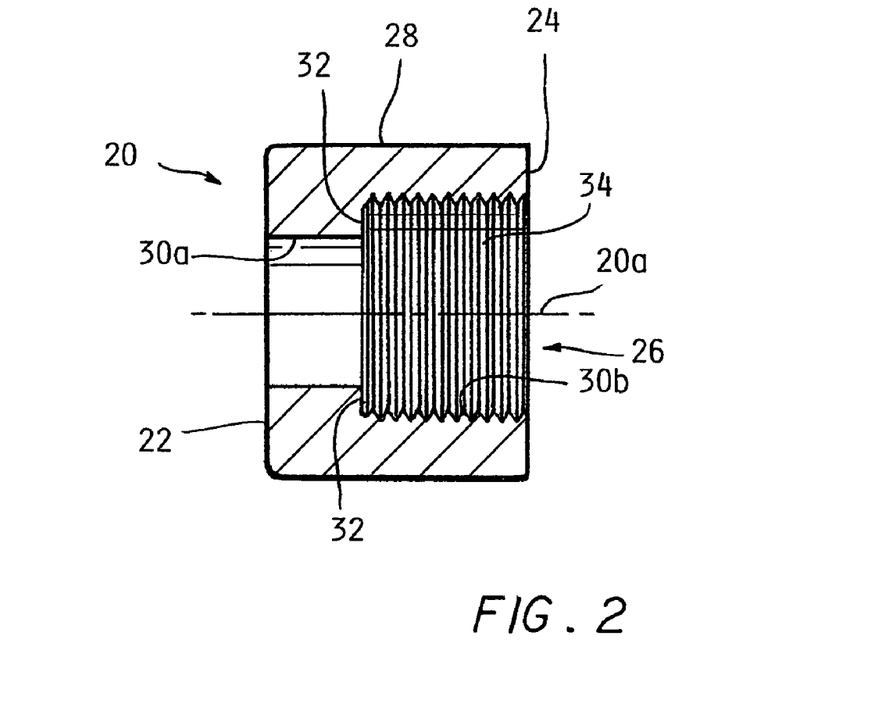
FIG. 2 is a sectional view of a nut of the apparatus for connecting air conditioning coolant lines according to the first embodiment of the present invention.

In order to secure the coupler body 70 to the aircraft coolant line 1, the nut 20 is designed to be slidably disposed around the outer periphery 2 of the aircraft coolant line 1. Accordingly, the nut 20 is substantially tubular, having an internal passageway 26 that extends along a longitudinal axis 20a between a first end 22 and a second end 24 of the nut 20, as shown in FIG. 2. An outer periphery 28 of the nut 20 allows for gripping or manipulation of the nut 20 either by hand or by using a tool (not shown). Accordingly, the outer periphery 28 of the nut 20 may be substantially hexagonal-shaped for engagement with a tool, such as a conventional wrench, or may be provided with other geometric or surface features to allow for enhanced engagement by a hand or by a tool.

The inner periphery of the nut 20 provides a first inner periphery portion 30a that is adjacent to the first end 22 of the nut 20 and a second inner periphery portion 30b that is adjacent to the second end 24 of the nut 20. The first inner periphery portion 30a has an internal diameter that is relatively smaller than the internal diameter of the second inner periphery portion 30b, and the first inner periphery portion 30a is separated from the second inner periphery portion 30b by a radially extending shoulder 32 that faces the second end 24 of the nut 20. At least part of the second inner periphery portion 30b of the nut 20 has a threaded portion 34 formed thereon for engagement with the coupler body 70, as will be explained in detail herein.

To secure the aircraft coolant line 1 to the coupler body 70, the deformable annular retainer 40 is a substantially annular member fabricated from a deformable material and designed to respond to axial force by deforming radially, which causes frictional engagement of the deformable annular retainer 40 with both the coolant line 1 and the coupler body 70. In this regard, it is important to note that the deformable annular retainer 40, namely the front ferrule 42 and the back ferrule 54, may slide with respect to the aircraft coolant line 1 when first assembled and prior to being swaged to the aircraft coolant line 1. As is well known to those skilled in the art, swaging is a process by which axial force is applied to one or more ferrules, causing the ferrules to deform radially and grip an adjacent rod, tube, or sleeve. Accordingly, swaging causes the deformable annular retainer 40 to bite into the aircraft coolant line 1, thus fixing the deformable annular retainer 40 in place with respect to the aircraft coolant line 1. Swaging of the deformable annular retainer 40 to the aircraft coolant line 1 may occur when the coupler 10 is first moved to the engaged position, or the deformable annular retainer 40 may be pre-swaged to the aircraft coolant line 1 using a swaging tool (not shown) designed for this purpose, as is well known to those skilled in the art. The deformable annular retainer 40 will be described herein as a two-part construction having a pair of ferrules 42, 54. However, it is contemplated that a one-piece deformable annular retainer 40 could be provided.

Figure 3:
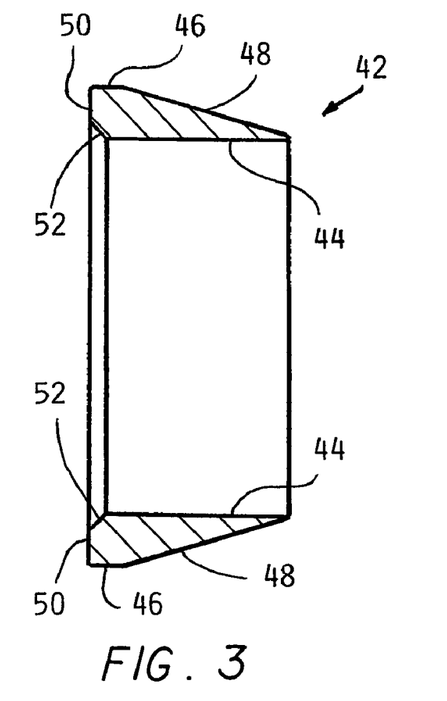
FIG. 3 is a sectional view of a front ferrule of the apparatus for connecting air conditioning coolant lines according to the first embodiment of the present invention.

The deformable annular retainer 40 includes a front ferrule 42, as shown in FIG. 3. The front ferrule 42 is a substantially annular member that is typically fabricated a deformable metallic material. The front ferrule 42 has an inner periphery 44 and an outer periphery 46 wherein the inner periphery 44 is adapted to engage the outer periphery 2 of the aircraft coolant line 1. A slight exterior taper 48 is located adjacent to the outer periphery 46 of the front ferrule 42 and substantially adjacent to the inner periphery 44 of the front ferrule 42. The exterior taper 48 extends at an acute interior angle with respect to the inner periphery 44 of the front ferrule 42, thus creating a variable thickness cross-section for at least a portion of the front ferrule 42. The exterior taper 48 is adapted to act as an engagement surface for engagement with the coupler body 70. A radially extending rear face 50 of the front ferrule 42 is adjacent to the outer periphery 46 of the front ferrule 42 and extends substantially perpendicular thereto. An interior taper 52 extends at an obtuse angle with respect to both the rear face 50 and the inner periphery 44 of the front ferrule 42. This creates a small, variable width gap between the front ferrule 42 and the outer periphery 2 of the aircraft cooling line 1 toward the rear of the inner periphery 44 of the front ferrule 42. Both the rear face 50 and the interior taper 52 are adapted to act as engagement surfaces for engagement with the back ferrule 54.

Figure 4:
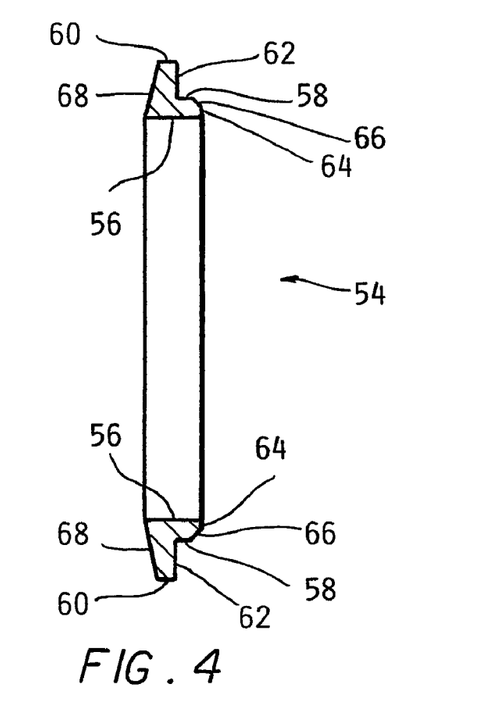
FIG. 4 is a sectional view of a back ferrule of the apparatus for connecting air conditioning coolant lines according to the first embodiment of the present invention.

The deformable annular retainer 40 also includes a back ferrule 54, as shown in FIG. 4. The back ferrule 54 is a substantially annular member fabricated from a deformable material, most typically a deformable metallic material, as similarly described with respect to the front ferrule 42. The back ferrule 54 has an inner periphery 56 and a stepped outer periphery having a first outer periphery portion 58 and a second outer periphery portion 60. In cross section, the inner periphery 56, the first outer periphery portion 58, and the second outer periphery portion 60 are substantially parallel. The second outer periphery portion 60 has a larger diameter as compared to the first outer periphery portion 58. The first and second outer periphery portions 58, 60 are separated by a radially extending shoulder 62 that is adjacent and substantially perpendicular to both the first outer periphery portion 58 and the second outer periphery portion 60. The radially extending shoulder 62 is adapted to act as an engagement surface for engagement with the rear face 50 of the front ferrule 42. Opposite the radially extending shoulder 62, a front face 64 is separated from the first outer periphery portion 58 by a chamfer 66 that forms obtuse interior angles with both the front face 64 and the first outer periphery portion 58. The front face 64 meets the inner periphery 56 of the back ferrule 54 substantially perpendicularly. Both the front face 64 and the chamfer 66 of the back ferrule 54 are adapted to act as engagement surfaces for engagement with the interior taper 52 of the front ferrule 42. Opposite the front face 64, a rear face 68 extends from the inner periphery 56 to the second outer periphery portion 60 of the back ferrule 54 at a slight angle or taper. The rear face 68 of the back ferrule 54 is adapted to act as an engagement surface for engagement with the radially extending shoulder 32 of the nut 20.

Figure 5:
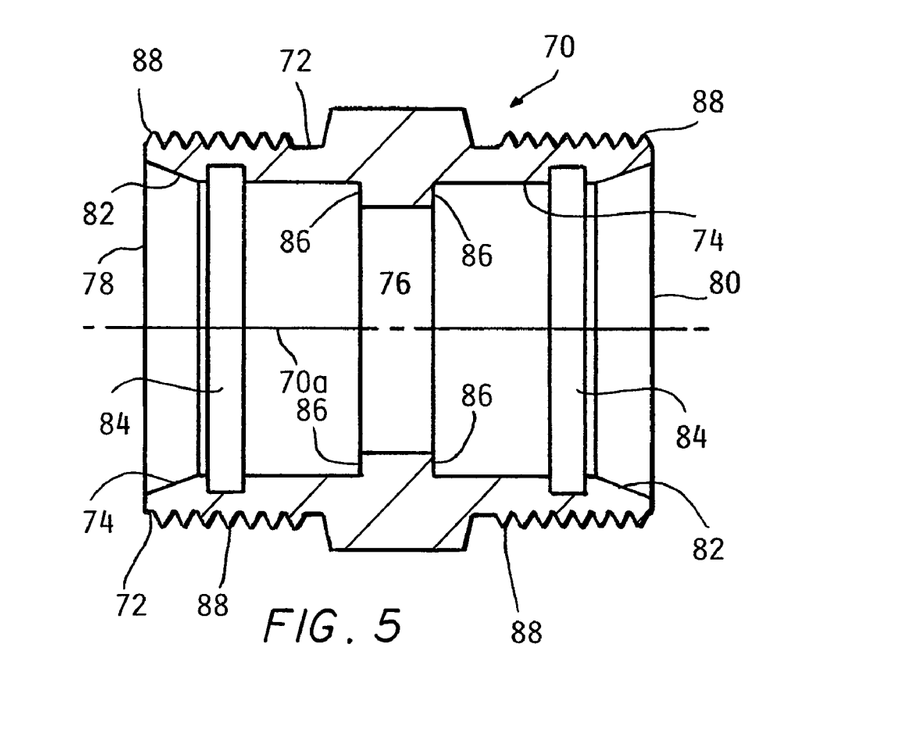
FIG. 5 is a sectional view of a coupler body of the apparatus for connecting air conditioning coolant lines according to the first embodiment of the present invention.

As best shown in FIG. 5, the geometry and size of the coupler body 70 are adapted to permit selective engagement of the coupler body 70 with the aircraft coolant line 1, the deformable annular retainer 40, and the nut 20. The coupler body 70 extends along a longitudinal axis 70a and has an outer periphery 72, an inner periphery 74, and a passageway 76 that is defined by the inner periphery 74. The coupler body 70 extends from a first end 78 to a second end 80 and is shown and described herein as substantially symmetrical about a plane perpendicular to its longitudinal axis, and thus, the coupler body 70 serves as a union coupler for joining the aircraft coolant line 1 to a second aircraft coolant line (not shown) at the opposite end of the coupler body 70 in a similar manner. However, the present invention is not necessarily limited in this manner, as it should be recognized that a single-ended coupler body 70 could be provided for use in other aircraft cooling system applications.

The outer periphery 72 of the coupler body 70 is sized so that it may be at least partially disposed within the nut 20. In particular, a screw thread 88 is provided on the outer periphery 72 of the coupler body 70 for threadingly engaging the screw thread 34 on the second inner periphery portion 30b of the nut 20. Accordingly, the nut 20 and the coupler body 70 may move between an unthreaded position, wherein the nut 20 and the coupler body 70 are threadingly disengaged, and a fully threaded position, wherein the screw thread 88 of the coupler body 70 is threadingly engaged with the screw thread 34 of the nut 20 to the greatest extent possible.

The inner periphery 74 of the coupler body 70 defines the passageway 76 in which the aircraft coolant line 1 is received. Near a midpoint between the first end 78 and the second end 80 of the coupler body 70, a shoulder 86 may be provided within the coupler body 70. The shoulder 86 is a constriction that defines an internal diameter smaller than the external diameter of the aircraft coolant line 1, and thus, the shoulder 86 controls the maximum insertion of the aircraft coolant line 1 into the coupler body 70. Between the shoulder 86 and first end 78 of the coupler body 70, the minimum internal diameter of the passageway 76 is at least as large as the outer periphery 2 of the aircraft coolant line 1.

To provide engagement of the coupler body 70 with the deformable annular retainer 40, a chamfered engagement surface 82 is formed in the inner periphery 74 of the coupler body 70 adjacent to the first end 78 of the coupler body 70. In particular, the chamfered engagement surface 82 is engageable with the exterior taper 48 of the front ferrule 42 of the deformable annular retainer 40. The chamfered engagement surface 82 provides the largest internal diameter for the passageway 76 adjacent to the first end 78 of the coupler body 70, and the internal diameter of the passageway 76 narrows toward the interior of the coupler body 70 throughout the length of the chamfered engagement surface 82.

Further inward on the inner periphery 74 of the coupler body 70 from the chamfered engagement surface 82, an annular groove 84 is formed in the inner periphery 74 of the coupler body 70. The annular groove 84 is sized so that the o-ring 90 may be disposed therein. The o-ring 90 is an elastic sealing ring, as well known in the art, and may have a substantially round cross-section, a substantially square cross-section, or some other suitable cross-sectional shape.

Figure 6:
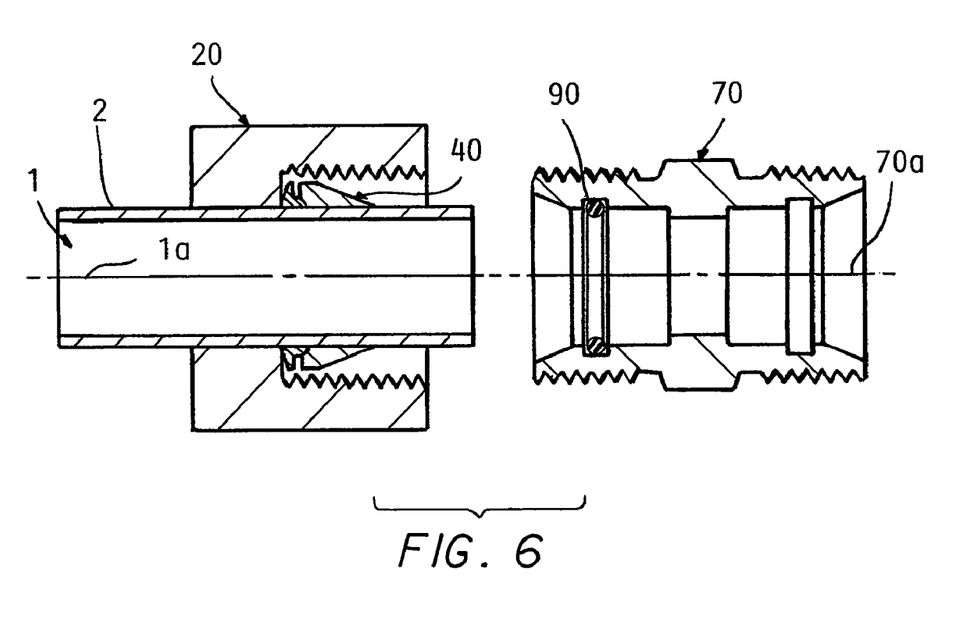
FIG. 6 is a sectional view of the apparatus for connecting air conditioning coolant lines according to the first embodiment of the present invention in a disengaged position.

In FIG. 6, the coupler 10 is shown in the disengaged position, wherein the coupler body 70 is not sealed with respect to the aircraft coolant line 1. Accordingly, the aircraft coolant line 1, the nut 20, and the deformable annular retainer 40 are at least pre-assembled but are not engaged with the coupler body 70 or the o-ring 90. In the disengaged position, the nut 20 is disposed on the aircraft coolant line 1, thereby defining an annular recess 36 between the outer periphery 2 of the aircraft coolant line 1 and the second inner periphery portion 30b of the nut 20 and extending from the second end 24 of the nut 20 to the radially extending shoulder 32 of the nut 20. The deformable annular retainer 40 is disposed on the aircraft coolant line 1 and within the annular recess 36, such that the radially extending shoulder 32 of the nut 20 abuts the rear face 68 of the back ferrule 54.

Figure 7:
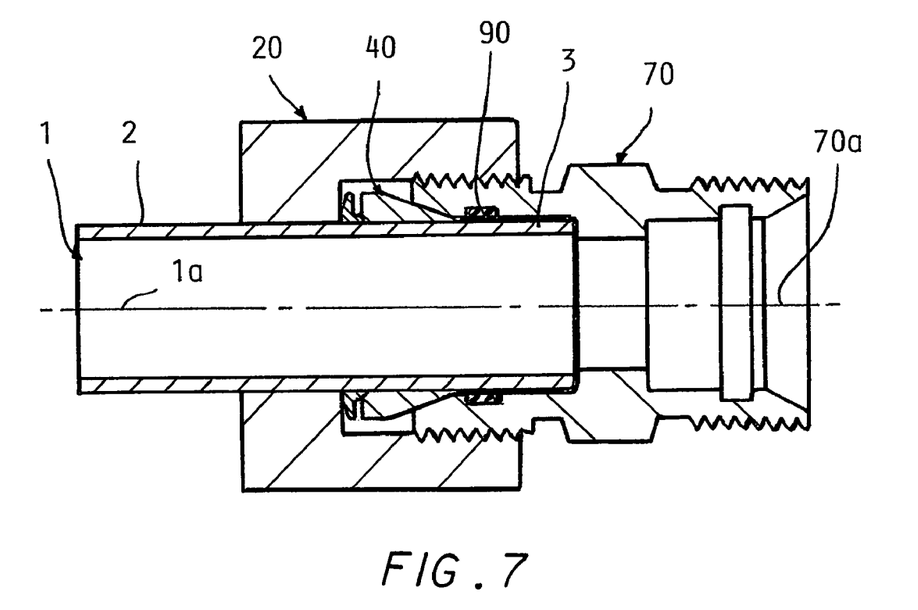
FIG. 7 is a sectional view of the apparatus for connecting air conditioning coolant lines according to the first embodiment of the present invention in an engaged position.

In FIG. 7, the coupler 10 is shown in the engaged position, wherein the coupler body 70 is sealed with respect to the aircraft coolant line 1 so that fluid, such as air conditioning coolant, may flow between the aircraft coolant line 1 and the coupler body 70 without leaking. In the engaged position, an end portion 3 of the aircraft coolant line 1 is at least partially disposed within the coupler body 70, and the o-ring 90 sealingly engages the inner periphery 74 of the coupler body 70 and the outer periphery 2 of the aircraft coolant line 1. The coupler body 70 is at least partially disposed within the annular recess 36 defined between the nut 20 and the end portion 3 of the of the aircraft coolant line 1, and accordingly, the screw thread 34 on the nut 20 is engaged with the screw thread 88 on the coupler body 70.

Comparing FIG. 6 to FIG. 7, movement of the coupler 10 from the disengaged position to the engaged position will be readily understood. In the disengaged position, the aircraft coolant line 1 and the coupler body 70 are positioned so that the longitudinal axis 1a of the aircraft coolant line 1 and the longitudinal axis 70a of the coupler body 70 are substantially aligned, so that the first end 78 of the coupler body 70 faces the second end 24 of the nut 20. The aircraft coolant line 1 is moved into the passageway 76 in the coupler body 70 and into sealing contact with the o-ring 90. The nut 20 is then engaged with the coupler body 70 by engaging the screw thread 34 on the second inner periphery portion 30b of the nut 20 with the screw thread 88 on the outer periphery 72 of the coupler body 70. As the nut 20 is threaded onto the coupler body 70, the coupler body 70 is drawn into the annular recess 36, and the chamfered engagement surface 82 on the inner periphery 74 of the coupler body 70 is drawn into engagement with the exterior taper 48 of the front ferrule 42. At the same time, the radially extending shoulder 32 of the nut 20 engages the back ferrule 54 and causes engagement of the front ferrule 42 and the back ferrule 54 with one another. In response to the axial compression placed upon them by the nut 20 and the coupler body 70, the front ferrule 42 and the back ferrule 54 deform radially, causing them to seal and frictionally engage the aircraft coolant line 1 and the coupler body 70.

In use, a user connects the aircraft coolant line 1 to the coupler body 70 by moving the coupler 10 from the disengaged position to the engaged position. The user first aligns the aircraft coolant line 1 with the coupler body 70 and then inserts the aircraft coolant line 1 into the passageway 76 until the aircraft cooling line 1 abuts the shoulder 86 of the coupler body 70, and the o-ring 90 engages the outer periphery 2 of the aircraft coolant line 1 with the o-ring 90 to create a first seal between the coupler body 70 and the aircraft coolant line 1. The user then threads the nut 20 onto the coupler body 70, moving the nut 20 to the fully threaded position with respect to the coupler body 70. In doing so, the user causes the front ferrule 42 and the back ferrule 54 of the deformable annular retainer 40 to engage the nut 20 and the coupler body 70, respectively, thereby swaging the deformable annular retainer to the aircraft coolant line 1 and creating a second seal between the coupler body 70 and the aircraft coolant line 1. Furthermore, the threaded engagement of the nut 20 and the coupler body 70 maintains engagement of the coupler body 70 and the deformable annular retainer 40. Once in the fully engaged position, the aircraft coolant line 1 is sealed with respect to the coupler body 70 by both the o-ring 90 and the deformable annular retainer 40.

To return the coupler 10 to the disengaged position, the user moves the nut 20 to the unthreaded position and removes the aircraft coolant line 1 from the coupler body 70.

Figure 8:
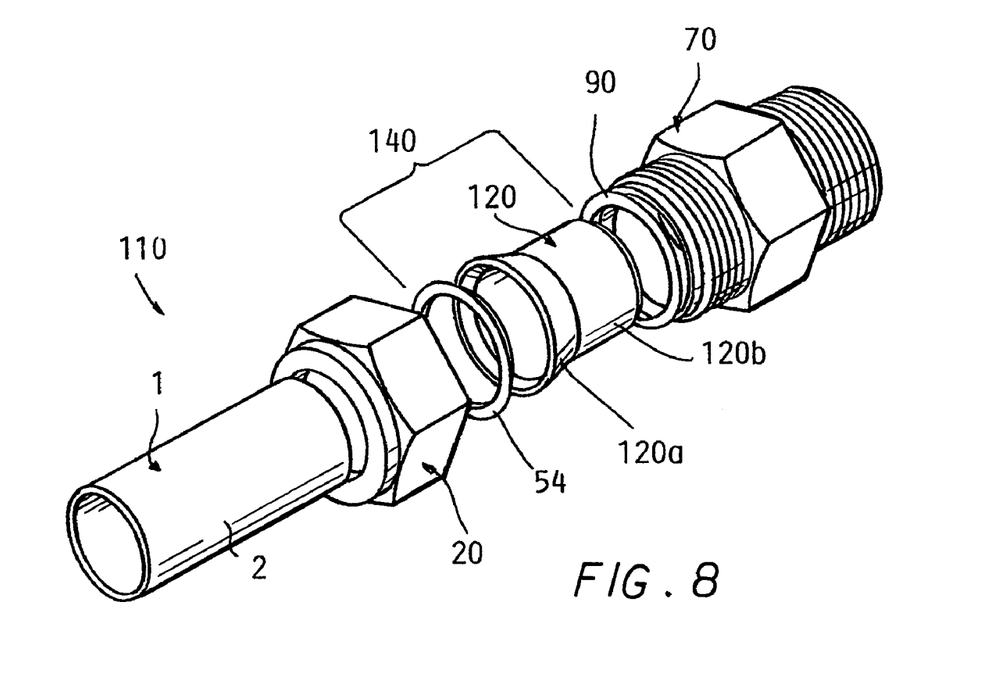
FIG. 8 is a perspective view of an apparatus for connecting air conditioning coolant lines according to a second embodiment of the present invention.

FIG. 8 shows a coupling apparatus or coupler 110 for connecting air conditioning coolant lines according to a second embodiment of the present invention. As in the coupler 10 according to the first embodiment, the coupler 110 of the second embodiment moves from a disengaged position to an engaged position to seal the coolant line 1 with respect to the coupler body 70. The coupler 110 also includes the nut 20, the back ferrule 54, and the O-ring 90, all of which are as described in connection with the first embodiment. However, the coupler 110 omits the front ferrule 42 and instead provides a ferrule tube 120 that cooperates with the back ferrule 54 to provide a deformable annular retainer 140.

In order to create a seal with respect to the aircraft coolant line 1, the ferrule tube 120 engages the back ferrule 54 to provide a deformable annular retainer 140 that deformably engages the aircraft coolant line 1. In particular, the deformable annular retainer 140 is swaged to the aircraft coolant line 1 when the coupler 110 is moved from the disengaged position to the engaged position, whereby the deformable annular retainer 140 responds to the axial forces applied to it by the nut 20 and the coupler body 70 by deformably biting into the aircraft coolant line 1, thus fixing the deformable annular retainer in place with respect to the aircraft coolant line 1. As with the deformable annular retainer 40 of the first embodiment, swaging of the deformable annular retainer 140 to the aircraft coolant line 1 may occur when the coupler 110 is first moved to the engaged position, or the deformable annular retainer 140 may be pre-swaged to the aircraft coolant line 1 using a swaging tool designed for this purpose, as is well known to those skilled in the art.

In order to create seals with respect to both the aircraft coolant line 1 and the coupler body 70, the ferrule tube 120 is interposed between the aircraft coolant line 1 and the coupler body 70. The ferrule tube 120 includes a ferrule portion 120*a* and a thin-walled tubular portion 120*b*. The ferrule tube 120 is a substantially cylindrical tubular structure but flares outward and increases in thickness in the ferrule portion 120*a*. In a like manner as described with regard to the front ferrule 42 of the first embodiment, the ferrule portion 120*a* of the ferrule tube 120 engages the back ferrule 54 deformably so as to provide the deformable annular retainer 140 that, when the coupler 110 is moved to the engaged position from the disengaged position, creates a seal with respect to the aircraft coolant line 1. The thin-walled tubular portion 120*b* is formed integrally with the ferrule portion 120*a* and completely covers the end portion 3 of the aircraft coolant line 1. Thus, when the coupler 110 is in the engaged position, the tubular portion 120*b* of the ferrule tube 120 extends over the end portion 3 of the aircraft coolant line 1 such that the ferrule tube 120 abuts the inner periphery 74 of the coupler body 70 and seals with respect to the O-ring 90. The ferrule tube 120 is fabricated from metal, such as aluminum or stainless steel, and is most typically fabricated from the same type of metal from which the aircraft coolant line 1 is fabricated.

Figure 9:
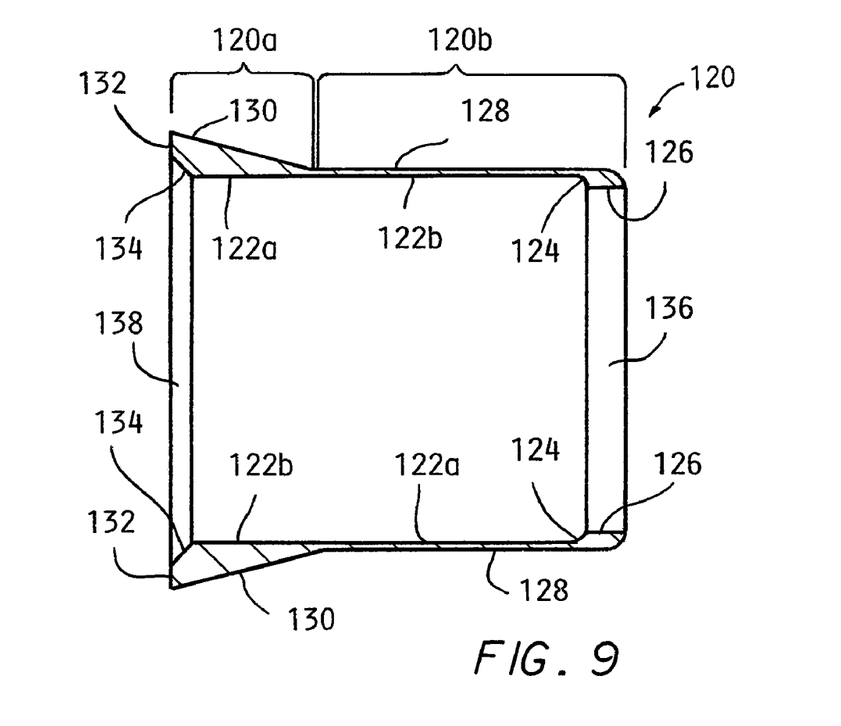
FIG. 9 is a sectional view of a ferrule sleeve of the apparatus for connecting air conditioning coolant lines according to the second embodiment of the present invention.

As best seen in FIG. 9, the ferrule portion 120*a* of the ferrule tube 120 is located at a front end 136 of the ferrule tube 120, while the tubular portion 120*b* of the ferrule tube 120 is located at a rear end 138 of the ferrule tube 120. The ferrule tube 120 has a substantially continuous inner periphery 122*a*, 122*b* including a front inner periphery portion 122*b* disposed in the tubular portion 120*b* of the ferrule tube 120 and a rear inner periphery portion 122*a* disposed in the ferrule portion 120*a* of the ferrule tube 120. In the tubular portion 120*b* of the ferrule tube 120, a slight shoulder 124 is formed adjacent to the front inner periphery portion 122*b* near the front end 136 of the ferrule tube 120. The shoulder 124 leads to a reduced diameter opening 126. The reduced diameter opening 126 is slightly smaller in diameter than the front inner periphery portion 122*b* of the ferrule tube 120. Thus, when the aircraft coolant line 1 is inserted into the ferrule tube 120, the end portion 3 of the aircraft coolant line 1 abuts the shoulder 124, thereby prohibiting the aircraft coolant line 1 from exiting the ferrule tube 120 through the reduced diameter opening 126.

The outer periphery 128 of the tubular portion 120*b* of the ferrule tube 120 is adjacent to the reduced diameter opening 126 and opposite the front inner periphery portion 122*b* of the tubular portion 120*b* of the ferrule tube 120. The outer periphery 128 of the ferrule tube 120 is adapted to engage the o-ring 90, as well as the inner periphery 74 of the coupler body 70. To ensure a proper seal between the tubular portion 120*b* of the ferrule tube 120 and the o-ring 90, the outer periphery 128 of the tubular portion 120*b* of the ferrule tube 120 is substantially smooth and substantially free from scratches. More particularly, the outer periphery 128 of the ferrule tube 120 may be polished to approximately sixteen microns.

In order to provide the ferrule portion 120*a* on the ferrule tube 120, the ferrule portion 120*a* includes an exterior taper 130 that is disposed rearward of the outer periphery 128 of the tubular portion 120*b* of the ferrule tube 120. The exterior taper 130 extends to the rear end 138 of the ferrule tube 120 where a radially-extending rear face 132 of the ferrule portion 120*a* of the ferrule tube 120 is adjacent to the exterior taper 130 and extends substantially perpendicular thereto. An interior taper 134 of the ferrule portion 120*a* of the ferrule tube 120 extends at an obtuse angle with respect to both the rear face 132 and the rear inner periphery portion 122*a* of the ferrule portion of the ferrule tube 120. This creates a small, variable width gap between the ferrule portion 120*a* of the ferrule tube 120 and the outer periphery 2 of the aircraft coolant line 1 toward the rear end 138 of the ferrule tube 120. Both the rear face 132 and the interior taper 134 are adapted to engage the back ferrule 54 during and after the swaging process.

Figure 10:
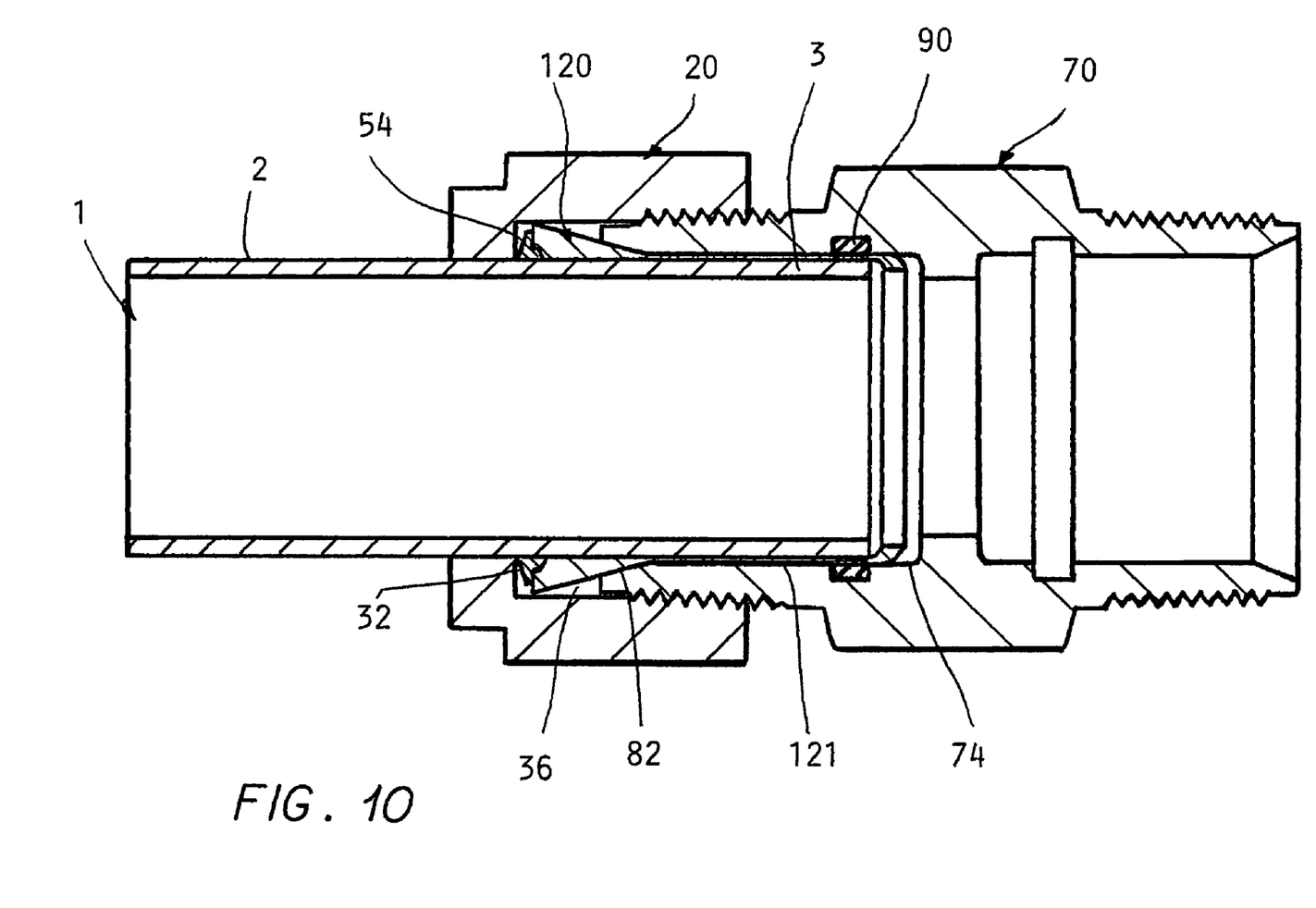
FIG. 10 is a sectional view of the apparatus for connecting air conditioning coolant lines according to the second embodiment of the present invention in an engaged position.

The engaged position of the coupler 110, as shown in FIG. 10, is established by first placing the nut 20 on the aircraft coolant line 1, and then placing or pre-swaging the back ferrule 54 and the ferrule tube 120 on the aircraft coolant line 1. In order to provide an additional seal, a layer of an adhesive sealant material 121 may be provided between the ferrule tube 120 and the aircraft coolant line 1 by coating either the front and rear interior periphery portions 122b, 122a of the ferrule tube or the outer periphery 2 of the aircraft coolant line 1 with the adhesive sealant material 121 prior to assembly. The adhesive sealant material 121 may be any conventional adhesive sealant that is compatible with the fluid carried by the aircraft coolant line 1. The aircraft coolant line 1 and the coupler body 70 are then positioned so that the longitudinal axis 1a of the aircraft coolant line 1 and the longitudinal axis 70a of the coupler body 70 are substantially aligned. Next, the aircraft coolant line 1 is moved into the passageway 76 in the coupler body 70, thus engaging the tubular portion 120b of the ferrule tube 120 in sealing contact with the o-ring 90. The nut 20 is then engaged with the coupler body 70 by threading the nut to the coupler body 70. As the nut 20 is threaded onto the coupler body 70, the coupler body 70 is drawn into the annular recess 36 of the nut, and the chamfered engagement surface 82 on the inner periphery 74 of the coupler body 70 is drawn into engagement with the exterior taper 130 of the ferrule portion 120a of the ferrule tube 120. At the same time, the radially extending shoulder 32 of the nut 20 engages the back ferrule 54 and causes engagement of the ferrule portion 120a of the ferrule tube 120 and the back ferrule 54 with one another. In response to the axial compression placed upon them by the nut 20 and the coupler body 70, the ferrule portion 120a of the ferrule tube 120 and the back ferrule 54 deform radially, causing them to seal and frictionally engage the aircraft coolant line 1 and the coupler body 70.

In use, a user connects the aircraft coolant line 1 to the coupler body 70 by moving the coupler 110 from the disengaged position to the engaged position. Initially, the user places the nut 20 and the back ferrule 54 on the aircraft coolant line 1. The user then places the ferrule tube 120 on the end portion 3 of the aircraft coolant line 1 such that the end portion 3.of the aircraft coolant line 1 abuts the shoulder 124 of the ferrule tube 120. At this point, the back ferrule 54 and the ferrule tube 120 may be pre-swaged to the aircraft coolant line 1, if desired. Next, the user aligns the aircraft coolant line 1 with the couplet body 70 and inserts the aircraft coolant line 1 into the coupler body 70 until the o-ring 90 engages the outer periphery 128 of the ferrule tube 120 to create a seal between the coupler body 70 and the ferrule tube 120. The user then threads the nut 20 onto the coupler body 70 and moves the nut 20 to the fully-threaded position with respect to the coupler body 70 using, for example, a wrench (not shown). In doing so, the user causes the back ferrule 54 and the ferrule portion 120a of the ferrule tube 120 to engage the nut 20 and the coupler body 70, respectively, thereby swaging the back ferrule 54 and the ferrule portion 120a of the ferrule tube 120 to the aircraft coolant line 1, thus creating a seal between the back ferrule 54, the ferrule tube 120, and the aircraft coolant line 1. Furthermore, the threaded engagement of the nut 20 and the coupler body 70 maintains engagement of the coupler body 70 with the ferrule tube 120. Once in the fully engaged position, the aircraft coolant line 1 is sealed with respect to the coupler body 70 by both the O-ring 90 and the ferrule tube 120.

To return the coupler 110 to the disengaged position, the user moves the nut 20 to the unthreaded position and removes the aircraft coolant line 1 from coupler body 70.

Although the foregoing embodiments describe the aircraft coolant line 1 for transporting coolant, it should be understood that the coupler 10 of the first embodiment and the coupler 110 of the second embodiment are not limited to use with coolant. Rather, the couplers 10, 110 may be used with any type of fluid, including both liquids and gases.

While the invention has been described in connection with what is presently considered to be the most practical and preferred embodiment, it is to be understood that the invention is not to be limited to the disclosed embodiments, but on the contrary, it is intended to cover various modifications and equivalent arrangements included within the spirit and scope of the appended claims. The scope is to be accorded the broadest interpretation so as to encompass all such modifications and equivalent structures as is permitted under the law.

What is claimed is:

1. An apparatus for connecting air conditioning coolant lines, comprising:
   a coupler body having a passageway extending therethrough, and said coupler body having an annular groove formed therein adjacent to said passageway;
   a coolant line having an end portion disposed within said passageway;
   a nut for receiving said coolant line and threadedly engaging said coupler body;
   a ferrule tube having said end portion of said coolant line disposed therein, said ferrule tube having an inwardly extending shoulder at a first end thereof for limiting insertion of the coolant line, an elongate tubular portion of substantially constant diameter prior to assembly, said elongate tubular portion extending along a majority of the length of said ferrule tube, from said inwardly extending shoulder to a ferrule portion of said ferrule tube, said ferrule portion having an outwardly extending exterior taper that, prior to assembly, increases in diameter from said elongate tubular portion of said ferrule tube toward said second end of said ferrule tube, and said ferrule portion having an interior taper that is formed on an interior periphery of said ferrule tube at said second end of said ferrule tube, said interior taper decreasing in diameter from said second end of said ferrule tube toward said first end of said ferrule tube;
   a back ferrule, wherein said threaded engagement of said nut with said coupler body urges said ferrule tube and said back ferrule into a sealing engagement with said coupler body and said coolant line by engagement of said ferrule tube with said coupler body and said coolant line, engagement of said back ferrule with said nut, and engagement of said back ferrule with said interior taper of said ferrule tube; and
   a flexible annular seal disposed within said passageway of said coupler body for sealingly engaging said ferrule tube, and said flexible annular seal at least partially disposed within said annular groove.

2. The apparatus stated in claim 1, further comprising:
   said nut having a first inner periphery portion and a second inner periphery portion, wherein said first inner periphery portion slidably engages said coolant line and said second inner periphery portion is radially spaced from said coolant line to define an annular recess; and
   said back ferrule and said ferrule portion of said ferrule tube disposed within said annular recess.

3. The apparatus stated in claim 1, further comprising:
   a chamfered engagement surface formed on said coupler body adjacent to said passageway for complementarily engaging said exterior taper of said ferrule portion of said ferrule tube.

4. The apparatus stated in claim 1, further comprising:
   said nut having a stepped inner periphery forming a radial shoulder therein for engagement with said back ferrule.

5. The apparatus stated in claim 1, further comprising:
   said ferrule tube and said back ferrule fabricated from metal.

6. The apparatus stated in claim 1, further comprising:
said end portion of said coolant line disposed within said tubular portion of said ferrule tube and in engagement with said inwardly extending shoulder of said ferrule tube.

7. The apparatus stated in claim 6, wherein an outer periphery of said tubular portion of said ferrule tube is polished.

8. The apparatus stated in claim 1, further comprising:
an adhesive sealant material disposed between said ferrule tube and said coolant line.

9. An apparatus for connecting air conditioning coolant lines, comprising:
a coupler body having an outer periphery, an inner periphery, and a passageway defined by said inner periphery;
said inner periphery of said coupler body having an annular groove formed therein;
a coolant line having an end portion disposed within said passageway;
a nut having an inner periphery and an outer periphery, and said inner periphery having a first inner periphery portion and a second inner periphery portion, wherein said first inner periphery portion slidably receives said coolant line, said second inner periphery portion is radially spaced from said coolant line to define an annular recess, and said second inner periphery portion threadedly engaging said outer periphery of said coupler body;
a ferrule tube having said end portion of said coolant line disposed therein, said ferrule tube having an inwardly extending shoulder at a first end thereof for limiting insertion of the coolant line, an elongate tubular portion of substantially constant diameter prior to assembly, said elongate tubular portion extending along a majority of the length of said ferrule tube from said inwardly extending shoulder to a ferrule portion of said ferrule tube, said ferrule portion having an outwardly extending exterior taper that, prior to assembly, increases in diameter from said elongate tubular portion of said ferrule tube toward said second end of said ferrule tube, and said ferrule portion having an interior taper that is formed on an interior periphery of said ferrule tube at said second end of said ferrule tube, said interior taper decreasing in diameter from said second end of said ferrule tube toward said first end of said ferrule tube;
a back ferrule disposed within said annular recess for engagement with said nut, said coolant line, said interior taper of said ferrule tube and said coupler body, wherein engagement of said nut with said coupler body urges said back ferrule and said ferrule tube into a sealing engagement with said coupler body and said coolant line; and
an o-ring at least partially disposed within said annular groove in said inner periphery of said coupler body for sealed engagement with said tubular portion of said ferrule tube.

10. The apparatus stated in claim 9, further comprising:
said inner periphery of said coupler body having a chamfered engagement surface formed therein, wherein said chamfered engagement surface of said coupler body complementarily engages said exterior taper of said ferrule portion of said ferrule tube.

11. The apparatus stated in claim 9, further comprising:
said ferrule tube and said back ferrule fabricated from metal.

12. The apparatus stated in claim 9, wherein an outer periphery of said tubular portion of said ferrule tube is polished.

13. The apparatus stated in claim 9, further comprising:
an adhesive sealant material disposed between said ferrule tube and said coolant line.

14. A method for connecting air conditioning coolant lines in restricted spaces, comprising:
applying an adhesive to an outer periphery of an air conditioning cooling line;
inserting the air conditioning coolant line into a deformable annular retainer, wherein the deformable annular retainer completely covers the end portion of the air conditioning coolant line;
providing a nut on the air conditioning coolant line subsequent to the step of inserting the air conditioning coolant line into the deformable annular retainer;
providing a coupler body having a passageway extending therethrough and a flexible annular seal disposed within the passageway;
engaging the deformable annular retainer with the flexible annular seal to create a first seal between the coupler body and the deformable annular retainer;
engaging the coupler body with the deformable annular retainer to create a second seal between the coupler body and the coolant line; and
tightening a threaded engagement of the nut and the coupler body to maintain engagement of the coupler body and the deformable annular retainer.

15. The method stated in claim 14, further comprising:
polishing the deformable annular retainer.

* * * * *